(12) United States Patent
Tekeli et al.

(10) Patent No.: US 11,118,960 B2
(45) Date of Patent: Sep. 14, 2021

(54) SYSTEM AND METHOD FOR MEASURING VIBRATION AND NOISE CHARACTERISTICS

(71) Applicant: FORD OTOMOTIV SANAYI A. S., Istanbul (TR)

(72) Inventors: Alper Tekeli, Istanbul (TR); Selcuk Celikel, Istanbul (TR); Fethi Semih Ozkan, Istanbul (TR); Kazi Nasiruddin Adil, Kocaeli (TR)

(73) Assignee: FORD OTOMOTIV SANAYI A.S., Istanbul (TR)

( * ) Notice: Subject to any disclaimer, the term of this patent is extended or adjusted under 35 U.S.C. 154(b) by 120 days.

(21) Appl. No.: 16/605,866

(22) PCT Filed: Feb. 6, 2018

(86) PCT No.: PCT/TR2018/050042
§ 371 (c)(1),
(2) Date: Oct. 17, 2019

(87) PCT Pub. No.: WO2019/022688
PCT Pub. Date: Jan. 31, 2019

(65) Prior Publication Data
US 2020/0072660 A1 Mar. 5, 2020

(30) Foreign Application Priority Data
Apr. 19, 2017 (TR) .................. 2017/05816

(51) Int. Cl.
*G01H 1/00* (2006.01)
*G01H 9/00* (2006.01)
(Continued)

(52) U.S. Cl.
CPC .................. *G01H 3/06* (2013.01); *G01H 9/00* (2013.01)

(58) Field of Classification Search
CPC ........ G01H 1/00–16; G01H 3/06; G01H 9/00; G01H 11/00–08; G01H 13/00; G01H 13/06; G01H 15/00; G01H 17/00
See application file for complete search history.

(56) References Cited

U.S. PATENT DOCUMENTS

| | | | | |
|---|---|---|---|---|
| 5,253,528 A | * | 10/1993 | Varterasian | ............ B23K 31/12 |
| | | | | 73/582 |
| 5,652,386 A | * | 7/1997 | Dimarogonas | .......... G01H 1/16 |
| | | | | 702/56 |

(Continued)

FOREIGN PATENT DOCUMENTS

| | | |
|---|---|---|
| DE | 19548158 A1 | 6/1997 |
| WO | 2007064806 A2 | 6/2007 |

OTHER PUBLICATIONS

S.Bakhtiari et al. Millimeter Wave Sensor For Far-Filed Standoff Vibrometry, AIP Conference Proceedings, Jan. 1, 2009, pp. 1641-1648.

*Primary Examiner* — Nguyen Q. Ha
(74) *Attorney, Agent, or Firm* — Bayramoglu Law Offices LLC

(57) ABSTRACT

A vibration and noise characteristics measurement device for the measurement of vibration and noise characteristics of structures or objects includes at least one excitation unit for applying excitation for the generation of vibrations on the structure on which vibration and noise characteristics measurements are desired, at least one response sensor for sensing the vibration and/or noise produced by the structure in response to applied excitation, and at least one control unit for controlling excitation unit and/or response sensor.

27 Claims, 2 Drawing Sheets

(51) Int. Cl.
  *G01H 13/00* (2006.01)
  *G01H 3/06* (2006.01)

(56) References Cited

U.S. PATENT DOCUMENTS

| | | | | |
|---|---|---|---|---|
| 5,838,439 | A * | 11/1998 | Zang | G01H 9/00 356/484 |
| 7,555,931 | B2 * | 7/2009 | Palmer | C21C 5/441 73/12.09 |
| 9,709,437 | B2 * | 7/2017 | Lau | G01H 9/002 |
| 2004/0093191 | A1 * | 5/2004 | Jeppsson | G01N 29/14 703/1 |
| 2004/0123665 | A1 * | 7/2004 | Blodgett | G01H 3/00 73/579 |
| 2006/0055937 | A1 * | 3/2006 | Lal | G01H 9/00 356/486 |
| 2012/0272740 | A1 | 11/2012 | Takahashi et al. | |
| 2013/0233084 | A1 | 9/2013 | Brandt et al. | |
| 2014/0047922 | A1 * | 2/2014 | Adams | G01M 7/025 73/588 |
| 2016/0230588 | A1 * | 8/2016 | Tine | G01H 13/00 |
| 2017/0038248 | A1 * | 2/2017 | Lovejoy | G01H 9/008 |
| 2019/0025159 | A1 * | 1/2019 | Tekeli | G01H 1/00 |

\* cited by examiner

SYSTEM AND METHOD FOR MEASURING VIBRATION AND NOISE CHARACTERISTICS

CROSS REFERENCE TO THE RELATED APPLICATIONS

This application is the national phase entry of International Application No. PCT/TR2018/050042, filed on Feb. 6, 2018, which is based upon and claims priority to Turkish Patent Application No. 2017/05816, filed on Apr. 19, 2017, the entire contents of which are incorporated herein by reference.

TECHNICAL FIELD

The present invention relates to a compact system and method for measuring vibration and noise characteristics that facilitates the measurement of vibration and noise characteristics of structures or objects.

BACKGROUND

Dynamic mechanical systems, e.g. motors, pumps, compressors used in automotive vehicles or household appliances, vibrate and generate noise due to their moving parts. However, vibration and noise have both physiological and psychological effects and have a direct influence on human health. Therefore, recently vibration and acoustic performances of mechanical systems have become one of the most important parameters that influence customer satisfaction. The vibration and acoustic performances are measured in anechoic chambers and/or reverberation chambers.

It is possible to determine whether multiple samples known to or appearing to have similar physical and material characteristics also have similar dynamic behaviors by taking a series of measurements. In order to characterize dynamic behaviors of structures, it is imperative that vibration and noise analyses of the structure be done and the natural frequencies and damping values of the structure be determined.

Presently, measurements and analyses of this kind can be performed by separate use of different equipment. There exists no compact system wherein different components and functions are integrated, which is capable of completing similar measurements in a swift manner. The method used to determine the vibration and noise characteristics of structures is the method of measuring frequency response function, wherein an excitation is applied to the structure for which frequency response function is desired to be determined. The excitation may be applied via electromagnetic modal shakers, modal hammers and speakers.

An application of a vibration and noise characteristics measurement method based on prior techniques, for example, using a modal shaker, requires the completion of the following steps:

In such an application, first it is necessary to activate a computer and a data acquisition system wherein the data to be processed will be collected and to ensure that the two are in communication. At the same time, the output channel of the data acquisition system must be connected to an amplifier via a cable and accordingly the modal shaker and the amplifier must be connected by a cable. A force sensor mounted to the tip of the stinger of the modal shaker allows the amplitude of the applied excitation to be measured. The force sensor is connected to the data acquisition system by a cable and information relating to the sensitivity of the sensor must be checked by a software present on the computer. Similarly, a suitable signal type (white noise, sinusoidal, sinusoidal scanning etc.) for exciting the structure is selected from the data acquisition software, force sensor is positioned at the desired excitation location and affixed to the surface of the structure using an adhesive. Meanwhile, a response measurement sensor (accelerometer, laser vibrometer, microphone etc.) is positioned at the desired response location. Response measurement sensor is connected to the data acquisition system by a cable and information relating to the sensitivity of the sensor are entered into the data acquisition software.

After the hardware infrastructure and connections described above are established, the "start measurement" command is given via the computer and the output signal is transmitted to the amplifier, the amplified signal actuates the modal shaker and the structure is excited. The excitation applied to the structure is measured by the force sensor, the analog signal is converted to a digital signal by the data acquisition system and saved by the computer. The vibration generated on the structure is measured by the response measurement sensor, converted to a digital signal by the data acquisition system and saved by the computer.

In the case where the above procedure is carried using an acoustic excitation unit instead of a modal shaker, the volumetric particle velocity measurement sensor of the acoustic excitation unit must be connected to the data acquisition system by a cable and the sensitivity information thereof must be entered into the software on the computer. In this case, the acoustic excitation unit is positioned at the desired excitation location. The excitation applied during the procedure is measured by the volumetric particle velocity measurement sensor; the analog signal is converted to a digital signal by the data acquisition system and saved by the computer.

Regardless of whether a modal shaker or an acoustic excitation unit is used, after the measurement process briefly mentioned above is completed, the excitation and response data are converted to frequency domain and the ratio of the output and input signals are used to calculate the frequency response function of the structure by the analysis software on the computer. The obtained frequency response function is plotted and compared with the target frequency response function. The natural frequency and damping ratios are calculated and compared with their respective target values.

As is evident, this procedure requires the electrical connection of many components in a suitable manner, and cumbersome preparation steps after set up such as determining calibration parameters and other process inputs. The system is slow and unsuitable to adapt to field conditions and lacks speed, practicality, portability and usability in place. In view of these disadvantages, the present invention is differentiated from the state of the art by providing swift measurement of vibration and noise characteristics and detailed analysis and reporting thereof.

SUMMARY

The primary object of the present invention is to realize the measurement of vibration and noise characteristics in a short time and in a swift manner.

Another object of the present invention is to realize the measurement of vibration and noise characteristics using a compact device in a practical manner.

Another object of the present invention is to realize the measurement of vibration and noise characteristics manually at different desired investigation locations using a portable device in a practical manner.

Another object of the present invention is to provide a system and method for measuring vibration and noise characteristics whereby the analyses relating to the measurement of vibration and noise characteristics are performed automatically.

Another object of the present invention is to provide a system and method for measuring vibration and noise characteristics whereby the analyses relating to the measurement of vibration and noise characteristics are reported automatically.

BRIEF DESCRIPTION OF THE DRAWINGS

Accompanying drawings are given solely for the purpose of exemplifying a vibration and noise characteristics measurement system, whose advantages over prior art were outlined above and will be explained in brief hereinafter.

The drawings are not meant to delimit the scope of protection as identified in the Claims, nor should they be referred to alone in an effort to interpret the scope identified in said Claims without recourse to the technical disclosure in the description of the present invention.

DETAILED DESCRIPTION OF THE EMBODIMENTS

Figure 1:
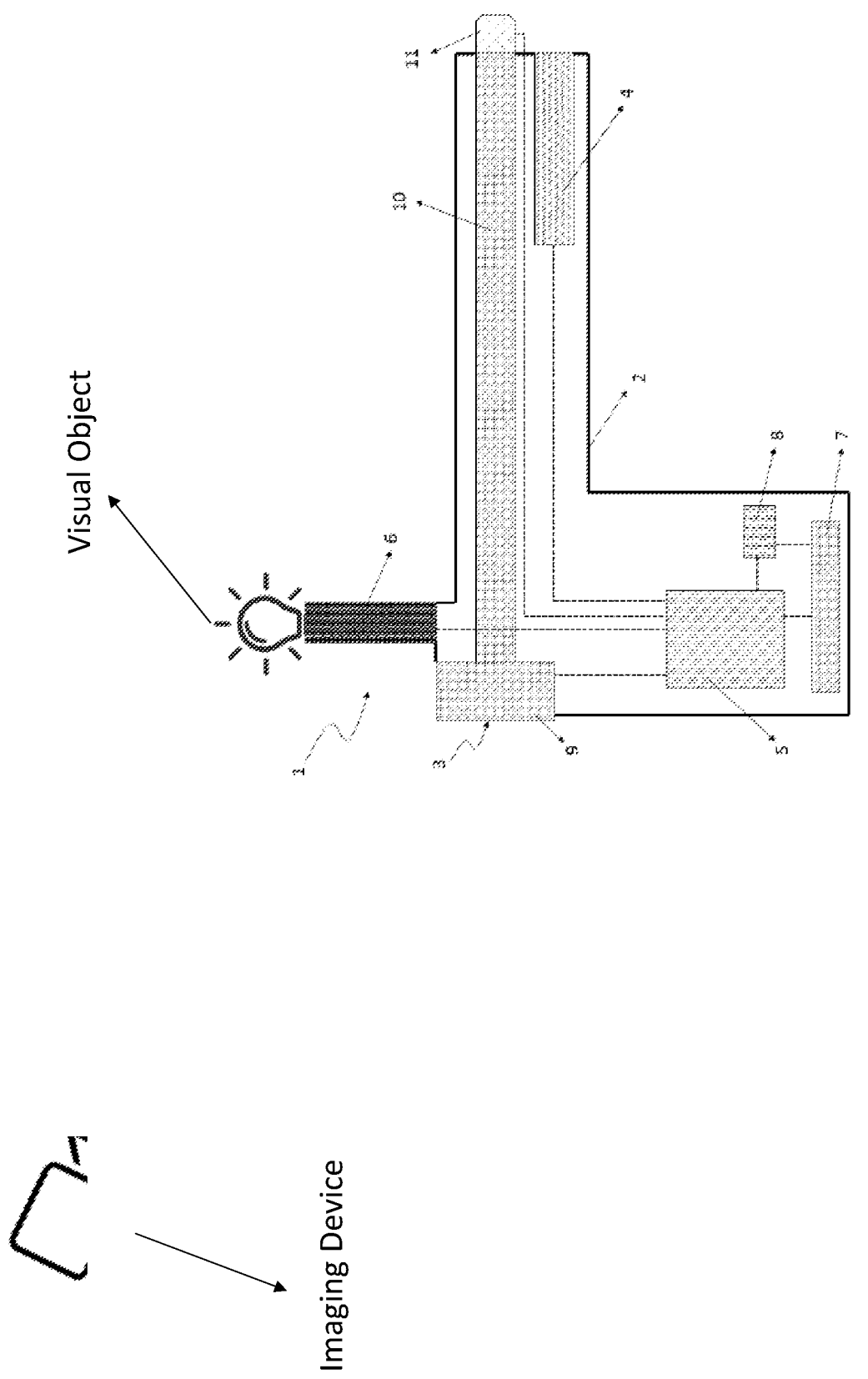
FIG. 1 shows a schematic representation of the vibration and noise characteristics measurement system that is the subject of the present invention.
Figure 2:
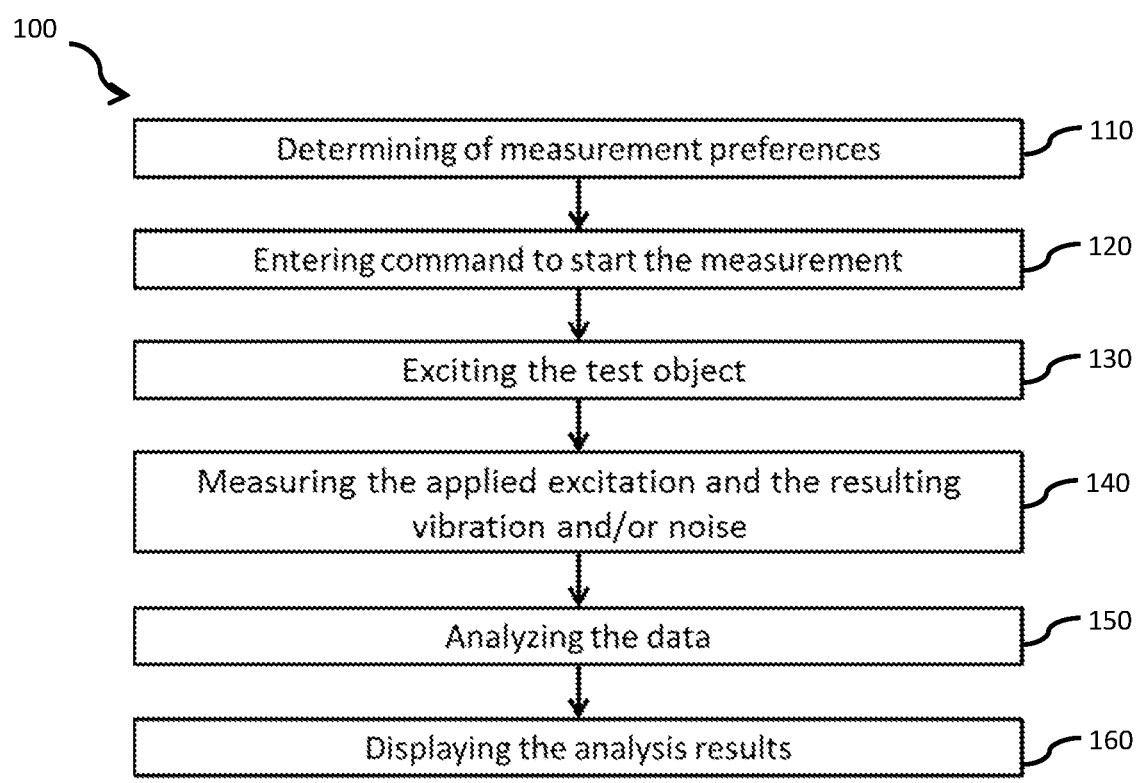
FIG. 2 shows a schematic representation of the vibration and noise characteristics measurement method that is the subject of the present invention.

The numerals given below are referred to in the detailed description of the present invention.

System Components

1) Vibration and noise characteristics measurement device
2) Body
3) Excitation unit
4) Response sensor
5) Control unit
6) Display unit
7) Communication unit
8) Storage unit
9) Excitation device
10) Wave guide
11) Excitation sensor Method Steps 100) Vibration and noise characteristics measurement method
110) Determining of measurement preferences
120) Entering command to start the measurement
130) Exciting the test object
140) Measuring the applied excitation and the resulting vibration and/or noise
150) Analyzing the data
160) Displaying the analysis results The details and operating principles of the system of the present invention that has been developed to determine the vibration and acoustic problems of structural units/structural elements much faster and automatically, having applications in technical fields such as household appliances, automotive, defense, aircraft/spacecraft etc., are provided below.

A vibration and noise characteristics measurement device (1) according to the present invention serves to measure the vibration and noise characteristics of structures and analyze, display and compare this data with target values using subsystems collected in a suitable manner and integrated to each other.

A vibration and noise characteristics measurement device (1) according to the present invention provides determination of the vibration and noise characteristics of structures. Said vibration and noise characteristics measurement device (1) comprises a body (2) wherein different components are assembled in order to operate in coordination and wherein said body (2) houses an excitation unit (3), a response sensor (4) and a control unit (5). Said control unit (5) preferably handles the storage and analysis of the collected data and the display of the results.

In essence, a vibration and noise characteristics measurement device (1) according to the present invention carries out the excitation of the structure that is the subject of study, the measurement of the excitation applied to the structure and the measurement of the response of the structure against the applied excitation. A method according to the present invention comprises the steps of analysis of measurement results, conversion of measurement results from time domain to frequency domain, separation of frequency domain measurements into real and imaginary, obtaining the proportions of the amplitude of the response of the structure to the real and imaginary amplitude of the excitation in the frequency domain separately and phase calculations.

The results obtained by the analysis method described above are generated as a result of calculation of natural frequencies and damping ratios related to the structures subject to analysis and all results are compared to target values.

A vibration and noise characteristics measurement device (1) according to the present invention contains an excitation unit (3), at least one response sensor (4) for sensing the vibration and/or noise produced by the objects and at least one control unit (5) for receiving data from excitation unit (3) and/or response sensor (4).

A vibration and noise characteristics measurement device (1) according to the present invention provides the contact or contactless excitation of the structure subject to analysis and the measurement of the applied excitation. In a preferred embodiment of the invention, the structure is excited in a contactless manner using a monopole sound source and the value of the excitation can be measured by the volumetric particle velocity measurement sensor. In another preferred embodiment of the invention, contactless response measurement can be realized using a laser vibrometer, particle velocity measurement sensor, microphone or sound intensity measurement sensor. The details of the components of the excitation unit (3) and the response sensor (4) are disclosed below.

The method used for the determination of the vibration and noise characteristics of structures is a method of measuring and analyzing frequency response functions wherein excitation are applied to the structure desired to measure the frequency response function thereof. Excitation may be applied using electromagnetic modal shakers, modal hammers and speakers. According to the present invention, excitation unit (3) realizes application of excitation.

At the same time, it is necessary for the level (amplitude) of the applied excitation to be sensed/measured. The amplitude of the applied excitation can be measured by a force sensor placed at the tips of the electromagnetic shakers and hammers. Modal shakers and modal hammers having a force sensor may be of different sizes depending on the desired level of force to be applied. Modal shakers require amplifying units and the output signal sent from the data acquisition system contains information about the amplitude and frequency of excitation provided by the modal shaker. Amplifying units are commercially available from companies such as PCB, Bruel Kjaer, Tira, LDS, Dytran, Endevco, etc.

Structures subject to analysis may also be excited by acoustic energy sources. Excitation can be applied to structures using sound waves produced by a monopole sound source passed through a wave guide having a reference sensor at its end, wherein the outlet of said guide is positioned close to the desired area on the structure. The excitation unit (3) according to the present invention can realize application of excitation by using an acoustic energy source. Accordingly, the excitation level is measured by the volumetric particle velocity measurement sensor placed at the outlet of the wave guide. Information on the amplitude and frequency of excitation provided by the acoustic shaker can be found in the output signal sent from the data acquisition system. Said function can be realized by commercially available products such as "Volume Source Exciter" by Siemens-LMS.

It is also necessary to measure the response of the structure under analysis against the applied excitation. It is possible to use a variety of response sensors (4) such as accelerometers, speed sensors, displacement sensors, laser vibrometers, microphones, etc. suitable for the amplitude and frequency range of the measurements. Hardware of this kind are commercially available from companies such as PCB, Bruel Kjaer, Kistler, Polytec, GRAS, etc.

In an embodiment of the present invention, a vibration and noise characteristics measurement device (1) that is capable of realizing functions in addition to those realized by excitation unit (3) and response sensor (4) alone, such as sensing/measuring the excitation level (amplitude) and sensing the response and that is integrated, compact, portable and usable on site is provided. In this embodiment, analog signals received from excitation unit (3) and response sensor (4) are passed through a frequency filter, converted to digital signals and stored by a data collection or storage unit (8). A control unit (5) in electrical communication with said storage unit (8) can preferably analyze the stored data and compare the analyzed results with target values in addition to controlling the functions of the system components.

A laser vibrometer measures the displacement between itself and the structure subject to analysis. In an embodiment of the present invention where said response sensor (4) is a laser vibrometer, said response sensor (4) is only limited to taking vibration measurements and does not have acoustic measurement capabilities. In an embodiment of the present invention where said response sensor (4) is a noise measurement unit, measurement of sound intensity-particle velocity-sound pressure is realized. A response sensor (4) of a vibration and noise characteristics measurement device (1) according to the present invention may comprise hardware for vibration measurements only, acoustic measurements only or for both vibration and noise measurements.

In an embodiment of the present invention where said excitation unit (3) is an acoustic excitation unit (3), contactless excitation of the structure is realized. Preferably, said response sensor (4) can be chosen as a vibration measurement unit or a noise measurement unit and frequency response functions are calculated after measurements. After measurements are completed, the obtained frequency response functions are analyzed, natural frequencies of the structure are calculated and mode shapes are drawn.

In a preferred embodiment of the present invention, vibration and noise characteristics measurement device (1) comprises at least one camera/imaging device positioned across from the measurement surface at a location where it is possible to view the complete surface. Said camera takes a photograph of the measurement surface. After the photograph is taken, a measurement is taken in the case where a "visual object" is present on the device. Said object may be a LED lamp, an infrared light source, an illuminated panel, an illuminated sphere, etc. When measurements are started, the image is processed to determine the position of visual object and is recorded as the measurement point on the first photograph in the storage. This process is repeated for every measurement point and a shell model is produced by connecting the measurement points. In alternative embodiment of the present invention, said imaging device can be integrated directly into the vibration and noise characteristics measurement device (1) and the images taken by said device are used to determine the measurement positions of said vibration and noise characteristics measurement device (1) and drawing of mode shapes using image processing algorithms.

In a preferred embodiment of the present invention, vibration and noise characteristics measurement device (1) can automatically prepare a vibration and noise characteristics measurement report for the structure subject to analysis.

A vibration and noise characteristics measurement method (100) according to the present invention comprises the steps of determining of measurement preferences (110), entering command to start the measurement (120), exciting the test object (130), measuring the applied excitation and the resulting vibration and/or noise (140), analyzing the data (150) and displaying the analysis results (160).

Possible practical applications of the device according to the present inventions are exemplified below. In the determining of measurement preferences (110) step, the excitation sensor (11) of excitation unit (3) is adjusted according to the settings below.

Choose type of excitation sensor (11) (vibration/noise)
Choose direction of excitation sensor (11) (according to Cartesian or cylindrical coordinates)
Choose mode of excitation sensor (11) (DC, AC, ICP, IEPP, Wheatstone Bridge etc.)
Choose measurement unit of excitation sensor (11) (N, m/s, Pa, etc.)
Enter sensitivity value of excitation sensor (11)
Choose voltage range for measurements of excitation sensor (11)

Similarly, excitation device (9) (speaker, shaker, etc.) is adjusted according to the settings below.

Choose type of signal to be applied (sinusoidal, white noise, etc.)
Choose frequency value or maximum and minimum frequency range of excitation signal based on signal type
Optionally, choose voltage of signal
Optionally, choose phase of signal Response sensor (4) is adjusted according to the settings below.

Choose type of response sensor (4) (vibration/noise)
Choose direction of response sensor (4) (according to Cartesian or cylindrical coordinates)

Choose mode of response sensor (4) (DC, AC, ICP, IEPP, Wheatstone Bridge etc.)
Enter sensitivity value of response sensor (4)
Choose voltage range for measurements of response sensor (4)
After the aforementioned parameter settings and other settings are designated, the steps given below are followed:
Maximum and minimum frequency range for measurement is chosen
Frequency resolution of measurement is chosen
Control unit (5) calculates the required measurement duration for desired frequency range and measurement resolution.
If averaging is desired, the number of samples is chosen, measurement duration is updated accordingly
Respective window types for response sensor (4) and excitation sensor (11) are chosen separately (Windowing, Hanning, etc.)
Type of measurement is chosen
  Time record
  Octave analysis
  Calculation of frequency response function (FRF, Coherence, Dynamic Stiffness)
  Spectrum analysis (Phased FFT)
  Autopower analysis (FFT without phase information)
  Sound intensity analysis, etc.
Which graphs to display on the measurement screen is chosen
Single or multiple measurement mode is chosen
  In the case of single measurement mode, measurement is taken after command is given and the results are graphed. When a new measurement command is given, the first measurement is deleted and the new measurement is graphed.
  In the case of multiple measurement mode, measurement is taken after command is given and the results are graphed and recorded to the memory. When a new measurement command is given, the average of the first measurement and last measurement is taken, new results are graphed and recorded to memory upon user confirmation. This process is continued until user gives the command to stop measurements.
If comparison with a target value is desired, said target values are chosen.

In the entering command to start the measurement (120) step, the device is positioned in the desired measurement location. The device is kept fixed in that position and the command to start the measurement is given to control unit (5) by pressing the "start measurement" display or start button on the control unit.

In the exciting the test object (130) step, control unit (5) transmits the excitation signal determined by the user to excitation unit (3). The excitation generated by excitation unit (3) is transferred/applied to the structure by wave guide (10).

In the measuring the applied excitation and the resulting vibration and/or noise (140) step, excitation sensor (11) transmits the signal containing time domain amplitude information of the applied excitation to control unit (5). Response sensor (4) measures the vibration and/or noise resulting from the applied excitation and transmits the time domain response signal to control unit (5). Control unit (5) transmits the received time domain signals to storage unit (8).

The results may be viewed via display unit (6) concurrently with the measurements.

In the analyzing the data (150) step, control unit (5) stops measurements after measurements are completed. Control unit (5) analyzes the stored measurement data based on user directives and transmits the analysis results to storage unit (8).

In the displaying the analysis results (160) step, the stored analysis results are plotted by control unit (5) based on user directives and transmitted to display unit (6). If desired by the user, the obtained results are compared with target values by control unit (5) and transmitted to display unit (6). All results can be transferred by communication unit (7) based on user preference.

In a nutshell, the present invention proposes a vibration and noise characteristics measurement device (1) for the measurement of vibration and noise characteristics of structures or objects, comprising, at least one excitation unit (3) for applying excitation for the generation of vibrations on the structure on which vibration and noise characteristics measurements are desired, at least one response sensor (4) for sensing the vibration and/or noise produced by the structure in response to applied excitation, and at least one control unit (5) for controlling excitation unit (3) and/or response sensor (4), In one variation of the present invention, said vibration and noise characteristics measurement device (1) comprises a body (2) defining a housing wherein said excitation unit (3) and said response sensor (4) are integrated and wherein said excitation unit (3) and said response sensor (4) are removable from body (2) housings within which they are integrated and changeable.

In a further variation of the present invention, said vibration and noise characteristics measurement device (1) comprises at least one excitation sensor (11) for sensing and measuring of the applied excitation level.

In a still further variation of the present invention, said control unit (5) has a structure that is integrated to body (2).

In a still further variation of the present invention, said excitation unit (3), excitation sensor (11) and response sensor (4) form a compact structure that is integrated to body (2).

In a still further variation of the present invention, said excitation unit (3) and excitation sensor (11) are usable separately after removing from body (2).

In a still further variation of the present invention, said excitation unit (3) for applying excitation for the generation of vibrations on the structure on which vibration and noise characteristics measurements are desired, is a contactless excitation unit (3) for contactless excitation of desired points.

In a still further variation of the present invention, said response sensor (4) for sensing the vibration and/or noise produced by the structure in response to applied excitation is a vibration measurement unit.

In a still further variation of the present invention, said vibration measurement unit is a laser vibration measurement unit.

In a still further variation of the present invention, said vibration measurement unit whereby the measurement of the displacement between itself and the structure being measured before, during or after the measurements is facilitated.

In a still further variation of the present invention, said control unit (5) facilitates generation of a shell model by recording the coordinate information of each measurement point and then connecting these coordinates.

In a still further variation of the present invention, said control unit (5) comprises a communication unit (7) in the form of an integrated remote network connection module for establishing a wired or wireless connection with an external analysis device for analyzing the measurement information and results.

In a still further variation of the present invention, said vibration and noise characteristics measurement device (1) comprises an internal display unit (6) for displaying the measurement information and results.

In a still further variation of the present invention, said vibration and noise characteristics measurement device (1) comprises an external display unit (6) for displaying the measurement information and results.

In a still further variation of the present invention, said vibration and noise characteristics measurement device (1) comprises an internal display unit (6) for displaying the structure being measured during the measurement and/or otherwise.

In a still further variation of the present invention, said vibration and noise characteristics measurement device (1) comprises an external display unit (6) for displaying the structure being measured during the measurement and/or otherwise.

In a still further variation of the present invention, said communication unit (7) is in communication with an internal or external unit via wired connection interfaces or protocols such as HDMI, USB, Thunderbolt, etc. or wireless connection interfaces or protocols such as Wi-Fi, Bluetooth, NFC, Infrared, etc.

In a still further variation of the present invention, said internal units that communication unit (7) is in communication with are storage unit (8), control unit (5) or display unit (6).

In a still further variation of the present invention, said vibration and noise characteristics measurement device (1) comprises a storage unit (8) or said control unit (5) is in wired and/or wireless communication with at least one storage unit (8).

In a still further variation of the present invention, said contactless acoustic excitation unit (3) comprises at least one sound source used as an excitation device (9) for generating vibrations on the structure being measured and at least one wave guide (10) for conditioning the acoustic energy from the sound source and directing said acoustic energy to at least one point on the structure.

In a still further variation of the present invention, said excitation sensor (11) measures the energy transferred onto the surface of the structure being measured.

In a still further variation of the present invention, said excitation unit (3) for applying excitation for the generation of vibrations on the structure on which vibration and noise characteristics measurements are desired comprises an excitation device (9) in the form of a modal shaker or a magnetic shaker or one that can utilize a pressurized fluid, for realizing the excitation at desired points.

In a still further variation of the present invention, said excitation unit (3) comprising an excitation device (9) that is electromagnetic or capable of utilizing a pressurized fluid further comprises at least one wave guide (10) or transfer channel for directing energy to at least one point on the structure being measured.

In a still further variation of the present invention, said excitation sensor (11) for sensing the level of the excitation applied to the structure being measured and determining the amplitude of the vibration and/or noise delivered to the surface of said structure is an accelerometer, a force sensor, a microphone, a particle velocity measurement sensor, a sound intensity probe or an acoustic volume velocity sensor.

In a still further variation of the present invention, said response sensor (4) for determining the amplitude of the vibration and/or noise generated on the surface of the structure being measured is an accelerometer, a speed sensor, a displacement sensor, a force sensor, a laser vibrometer, a microphone, a particle velocity measurement sensor, a sound intensity probe or vibration measuring camera system.

In a still further variation of the present invention, said vibration measuring camera system comprises a data processor/microcontroller utilizing image processing techniques.

In a still further variation of the present invention, said vibration and noise characteristics measurement device (1) comprises at least one visual element for detecting the position of said device and determining the measurement positions and wherein said visual element is detected by said imaging device using image processing techniques and measurement positions are determined.

In a still further variation of the present invention, said visual element is a light source.

In a still further variation of the present invention, said imaging device is positioned across from the measurement surface at a location where it is possible to view the complete surface and the position of said visual element placed on said vibration and noise characteristics measurement device (1) is determined based on the photograph of said measurement surface taken by said imaging device by image processing of the visual element.

In a still further variation of the present invention, said position of said visual element determined by image processing is recorded as a measurement point onto the first photograph in the memory.

In a still further variation of the present invention, said vibration and noise characteristics measurement device (1) comprises a power source and is capable of carrying out measurements in the field in a portable manner without needing an electrical connection.

In a still further variation of the present invention, said vibration and noise characteristics measurement device (1) is wireless.

In a still further variation of the present invention, said vibration and noise characteristics measurement device (1) comprises a handle for carrying said device in one hand.

In a still further variation of the present invention, said vibration and noise characteristics measurement device (1) comprises wheels or a carrier having wheels or a connection device for a tripod so that said vibration and noise characteristics measurement device (1) can be carried by sliding.

In a still further variation the present invention proposes a vibration and noise characteristics measurement method (100) for determining the frequency response function of a structure being measured, using a vibration and noise mapping system (1) described above, comprising the steps of:
  (a) excitation of the structure that is subject of study,
  (b) measurement of the excitation applied to the structure,
  (c) measurement of the response of the structure against the applied excitation,
  (d) conversion of measurement results from time domain to frequency domain,
  (e) separation of frequency domain measurements into real and imaginary,
  (f) obtaining the proportions of the amplitude of the response of the structure to the real and imaginary amplitude of the excitation in the frequency domain separately, (g) calculating the equivalent amplitude using the obtained results,
(h) evaluating phase calculations,
(i) calculating natural frequencies, and
(j) calculating damping ratios.

In a still further variation of the present invention, said vibration and noise characteristics measurement method (100) comprises the step of control unit (5) analyzing the measurement results and listing the amplitudes from maximum to minimum in order to determine the areas where vibration and noise intensity is maximum based on measurement points.

The present invention provides a compact and quick solution to measure and analyze the structure's vibration and noise characteristics, finding the natural frequencies and damping ratios and comparison of measurement data with target values.

What is claimed is:

1. A vibration and noise characteristics measurement device for measurement of vibration and noise characteristics of a structure, comprising:
   at least one excitation unit for applying an excitation for a generation of vibrations on the structure,
   at least one response sensor for sensing vibration and/or noise produced by the structure in response to the applied excitation,
   at least one control unit for controlling at least one of the excitation unit, or a response sensor,
   a body defining a housing, wherein the excitation unit and the response sensor are removably integrated in the housing;
   a display unit for displaying measurement information and results, and/or displaying the structure being measured during the measurement;
   at least one imaging device for detecting a visual object on the vibration and noise characteristics measurement device so as to determine a plurality of measurement positions on the structure, wherein the imaging device uses a plurality of image processing techniques to determine the plurality of measurement positions,
   wherein the imaging device is positioned across from a measurement surface at a location having complete view of the measurement surface; a position of the visual object placed on the vibration and noise characteristics measurement device is determined based on a photograph of the measurement surface taken by the imaging device by an image processing of the visual object, and the position of the visual object determined by the image processing is recorded as a measurement point onto a first photograph in a storage unit.

2. The vibration and noise characteristics measurement device according to claim 1, wherein, the excitation unit for applying the excitation for the generation of vibrations on the structure is a contactless excitation unit for a contactless excitation of desired points.

3. The vibration and noise characteristics measurement device according to claim 2, wherein, the contactless acoustic excitation unit comprises at least one sound source used as an excitation device for generating vibrations on the structure being measured and at least one wave guide for conditioning an acoustic energy from the sound source and directing the acoustic energy to at least one point on the structure.

4. The vibration and noise characteristics measurement device according to claim 3, wherein, an excitation sensor measures an energy transferred onto a surface of the structure being measured.

5. The vibration and noise characteristics measurement device according to claim 1, further comprising, at least one excitation sensor for sensing and measuring of an applied excitation level.

6. The vibration and noise characteristics measurement device according to claim 1, wherein, the control unit has a structure integrated to the body.

7. The vibration and noise characteristics measurement device according to claim 5, wherein, the excitation sensor is an accelerometer, a force sensor, a microphone, a particle velocity measurement sensor, a sound intensity probe or an acoustic volume velocity sensor.

8. The vibration and noise characteristics measurement device according to claim 5, wherein, the response sensor is an accelerometer, a speed sensor, a displacement sensor, a force sensor, a laser vibrometer, a microphone, a particle velocity measurement sensor, a sound intensity probe or a vibration measuring camera system.

9. The vibration and noise characteristics measurement device according to claim 8, wherein, the response sensor is the vibration measuring camera system and the vibration measuring camera system comprises a data processor or a microcontroller utilizing a plurality of image processing techniques.

10. The vibration and noise characteristics measurement device according to claim 5, wherein, the excitation unit, the excitation sensor and the response sensor form a compact structure integrated to the body.

11. The vibration and noise characteristics measurement device according to claim 5, wherein, the excitation unit and the excitation sensor are usable separately after removing from the body.

12. The vibration and noise characteristics measurement device according to claim 1, wherein, the response sensor for sensing the vibration, or a noise produced by the structure in response to the applied excitation is a vibration measurement unit.

13. The vibration and noise characteristics measurement device according to claim 12, wherein, the vibration measurement unit is a laser vibration measurement unit.

14. The vibration and noise characteristics measurement device according to claim 12, comprising: the vibration measurement unit whereby a measurement of a displacement between itself and the structure being measured before, during or after the measurement are facilitated.

15. The vibration and noise characteristics measurement device according to claim 14, wherein, the control unit facilitates a generation of a shell model by recording coordinates of each measurement point and then connects the coordinates.

16. The vibration and noise characteristics measurement device according to claim 1, wherein, the control unit comprises a communication unit in a form of an integrated remote network connection module for establishing a wired or a wireless connection with an external analysis device for analyzing the measurement information and results.

17. The vibration and noise characteristics measurement device according to claim 16, wherein, the communication unit is in communication with an internal unit or an external unit via a plurality of wired connection interfaces or protocols or a plurality of wireless connection interfaces or protocols.

18. The vibration and noise characteristics measurement device according to claim 17, wherein, the internal unit is the storage unit, the control unit or the display unit.

19. The vibration and noise characteristics measurement device according to claim 1, the control unit is in a wired or a wireless communication with the storage unit.

20. The vibration and noise characteristics measurement device according to claim 1, wherein, the excitation unit for applying the excitation for the generation of vibrations on the structure comprises the excitation device in a form of a modal shaker or a magnetic shaker or one having a pressurized fluid, for realizing the excitation at desired points.

21. The vibration and noise characteristics measurement device according to claim 20, wherein, the excitation unit further comprises at least one wave guide or a transfer channel for directing the energy to at least one point on the structure being measured.

22. The vibration and noise characteristics measurement device according to claim 1, wherein, the visual object is a light source.

23. The vibration and noise characteristics measurement device according to claim 1, further comprising a power source and is configured to carry out the measurement in a field in a portable manner without needing an electrical connection.

24. The vibration and noise characteristics measurement device according to claim 23, wherein, the vibration and noise characteristics measurement device is a wireless device.

25. The vibration and noise characteristics measurement device according to claim 24, further comprising a handle for carrying the vibration and noise characteristics measurement device in one hand.

26. A vibration and noise characteristics measurement method for determining a frequency response function of the structure being measured, using the vibration and noise characteristics measurement device according to claim 1, the method comprising:
   applying the excitation to the structure,
   measuring the excitation applied to the structure,
   measuring the response of the structure against the applied excitation,
   converting measurement results from a time domain to a frequency domain,
   separating frequency domain measurements into real and imaginary,
   obtaining a plurality of proportions of the amplitude of the response of the structure to a real and imaginary amplitude of the excitation in the frequency domain separately,
   calculating an equivalent amplitude using a plurality of obtained results,
   evaluating a plurality of phase calculations,
   calculating a plurality of natural frequencies, and
   calculating a plurality of damping ratios.

27. The vibration and noise characteristics measurement method according to claim 26, further comprising a step of analyzing the measurement results and listing the amplitudes from a maximum to a minimum in order to determine a plurality of areas where a vibration and noise intensity is maximum based on the measurement points.

* * * * *